United States Patent
Jiang et al.

(10) Patent No.: US 10,856,319 B2
(45) Date of Patent: Dec. 1, 2020

(54) LINK DEPENDENT SCHEDULING REQUEST FORMAT FOR URLLC

(71) Applicant: QUALCOMM Incorporated, San Diego, CA (US)

(72) Inventors: Jing Jiang, San Diego, CA (US); Wanshi Chen, San Diego, CA (US); Chong Li, Weehawken, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/058,529

(22) Filed: Aug. 8, 2018

(65) Prior Publication Data

US 2019/0053266 A1 Feb. 14, 2019

Related U.S. Application Data

(60) Provisional application No. 62/543,274, filed on Aug. 9, 2017.

(51) Int. Cl.
*H04W 72/12* (2009.01)
*H04W 76/27* (2018.01)
*H04L 27/26* (2006.01)

(52) U.S. Cl.
CPC ..... *H04W 72/1289* (2013.01); *H04L 27/2607* (2013.01); *H04L 27/2613* (2013.01); *H04W 76/27* (2018.02); *H04W 72/1284* (2013.01)

(58) Field of Classification Search
None
See application file for complete search history.

(56) References Cited

U.S. PATENT DOCUMENTS

| | | | |
|---|---|---|---|
| 2013/0163533 A1* | 6/2013 | Anderson | H04W 72/04 370/329 |
| 2019/0044639 A1* | 2/2019 | Ouchi | H04J 11/0073 |

(Continued)

OTHER PUBLICATIONS

Catt: "Further Details of Grant-based UL Transmission", 3GPP Draft; R1-1710093, 3rd Generation Partnership Project (3GPP), Mobile Competence Centre ; 650, Route Des Lucioles ; F-06921 Sophia-antipolis Cedex ; France vol. RAN WG1, No. Qingdao; Jun. 27, 2017-Jun. 30, 2017 Jun. 26, 2017, XP051299317, Retrieved from the Internet: URL:http://www.3gpp.org/ftp/Meetings_3GPP_SYNC/RAN1/Docs/ [retrieved on Jun. 26, 2017], 2 pages.

(Continued)

*Primary Examiner* — Mohammad S Adhami
(74) *Attorney, Agent, or Firm* — Patterson + Sheridan, L.L.P.

(57) ABSTRACT

Certain aspects of the present disclosure relate to wireless communication systems, and more particularly, to link-dependent scheduling request (SR) formats for ultra-reliable low-latency communications (URLLC) in communication systems operating according to new radio (NR) technologies. A method is provided, that may be performed by a base station (BS) for wireless communications. The method includes determining one or more channel conditions for a link between the BS and a user equipment (UE). The BS assigns a SR format to the UE based on the one or more channel conditions. The UE receives the SR format assignment and transmits one or more SR transmissions to the BS according to the assigned SR format.

22 Claims, 10 Drawing Sheets

DETERMINE ONE OR MORE CHANNEL CONDITIONS FOR A LINK BETWEEN THE BS AND A USER EQUIPMENT (UE) ⟶ 702

ASSIGN A SCHEDULING REQUEST (SR) FORMAT TO THE UE BASED ON THE ONE OR MORE CHANNEL CONDITIONS ⟶ 704

(56) References Cited

U.S. PATENT DOCUMENTS

| | | | |
|---|---|---|---|
| 2019/0150176 A1* | 5/2019 | Pelletier | H04W 72/1247 |
| | | | 370/329 |
| 2019/0190687 A1* | 6/2019 | Yi | H04L 5/001 |
| 2019/0215824 A1* | 7/2019 | Takeda | H04L 5/0007 |
| 2020/0059949 A1* | 2/2020 | Byun | H04W 72/12 |

OTHER PUBLICATIONS

International Search Report and Written Opinion—PCT/US2018/045910—ISA/EPO—dated Oct. 19, 2018.
NTT Docomo et al., "Scheduling Request Design in NR system", 3GPP Draft; R1-1708480, 3rd Generation Partnership Project (3GPP), Mobile Competence Centre ; 650, Route Des Lucioles ; F-06921 Sophia-antipolis Cedex ; France vol. RAN WG1, No. Hangzhou; May 15, 2017-May 19, 2017 May 14, 2017, XP051273672, Retrieved from the Internet: URL:http://www.3gpp.org/ftp/Meetings_3GPP_SYNC/RAN1/Docs/ [retrieved on May 14, 2017], 3 pages.
Samsung: "SR Transmission for Multiple Configurations", 3GPP Draft; R1-1710721—SR Transmission for Multiple Configurations, 3rd Generation Partnership Project (3GPP), Mobile Competence Centre ; 650, Route Des Lucioles ; F-06921 Sophia-antipolis Cedex ; France vol. RAN WG1, No. Qingdao, P.R. China; Jun. 27, 2017-Jun. 30, 2017 Jun. 16, 2017, XP051304351, Retrieved from the Internet: URL:http://www.3gpp.org/ftp/tsg_ran/WG1_RL1/TSGR1_AH/NR_AH_1706/Docs/ [retrieved on Jun. 16, 2017], 3 pages.

* cited by examiner

LINK DEPENDENT SCHEDULING REQUEST FORMAT FOR URLLC

CROSS-REFERENCE TO RELATED APPLICATION & PRIORITY CLAIM

This application claims benefit of and priority to U.S. Provisional Patent Application Ser. No. 62/543,274, filed Aug. 9, 2017, herein incorporated by reference in its entirety as if fully set forth below and for all applicable purposes.

INTRODUCTION

Field of the Disclosure

The present disclosure relates generally to communication systems, and more particularly, to a link dependent scheduling request (SR) format for ultra-reliable low-latency communications (URLLC) in communication systems operating according to new radio (NR) technologies.

Description of Related Art

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

In some examples, a wireless multiple-access communication system may include a number of base stations (BSs), which are each capable of simultaneously supporting communication for multiple communication devices, otherwise known as user equipments (UEs). In an LTE or LTE-A network, a set of one or more base stations may define an eNodeB (eNB). In other examples (e.g., in a next generation, a new radio (NR), or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more DUs, in communication with a CU, may define an access node (e.g., which may be referred to as a BS, 5G NB, next generation NodeB (gNB or gNodeB), transmission reception point (TRP), etc.). A BS or DU may communicate with a set of UEs on downlink channels (e.g., for transmissions from a BS or DU to a UE) and uplink channels (e.g., for transmissions from a UE to BS or DU).

These multiple access technologies have been adopted in various telecommunication standards to provide a common protocol that enables different wireless devices to communicate on a municipal, national, regional, and even global level. NR (e.g., new radio or 5G) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

BRIEF SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between access points and stations in a wireless network.

Certain aspects provide a method for wireless communication by a base station (BS). The method generally includes determining one or more channel conditions associated with a link between the BS and a user equipment (UE). The method includes assigning a scheduling request (SR) format to the UE based on the one or more channel conditions.

Certain aspects provide a method for wireless communication by a UE. The method generally includes receiving a SR format assignment from a BS. The SR format is based on one or more channel conditions associated with a link between the UE and the BS. The method includes transmitting one or more SRs to the BS according to the assigned SR format.

Certain aspects provide an apparatus for wireless communications. The apparatus generally includes means for determining one or more channel conditions associated with a link between the apparatus and a UE. The apparatus includes means for assigning a SR format to the UE based on the one or more channel conditions.

Certain aspects provide an apparatus for wireless communications. The apparatus generally includes means for receiving a SR format assignment from a BS. The SR format is based on one or more channel conditions associated with a link between the apparatus and the BS. The apparatus includes means for transmitting one or more SRs to the BS according to the assigned SR format.

Certain aspects provide an apparatus for wireless communications. The apparatus generally includes at least one processor coupled with a memory and configured to determine one or more channel conditions associated with a link between the apparatus and a UE and assign a SR format to the UE based on the one or more channel conditions.

Certain aspects provide an apparatus for wireless communications. The apparatus generally includes a receiver configured to receive a SR format assignment from a BS. The SR format is based on one or more channel conditions associated with a link between the apparatus and the BS. The apparatus includes a transmitter configured to transmit one or more SRs to the BS according to the assigned SR format.

Certain aspects provide a computer readable medium having computer executable code stored thereon. The computer executable code generally includes code for determining one or more channel conditions associated with a link between a BS and a UE. The computer executable code includes code for assigning a SR format to the UE based on the one or more channel conditions.

Certain aspects provide a computer readable medium having computer executable code stored thereon. The computer executable code generally includes code for receiving a SR format assignment from a BS. The SR format is based on one or more channel conditions associated with a link between the apparatus and the BS. The computer executable code includes code for transmitting one or more SRs to the BS according to the assigned SR format.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
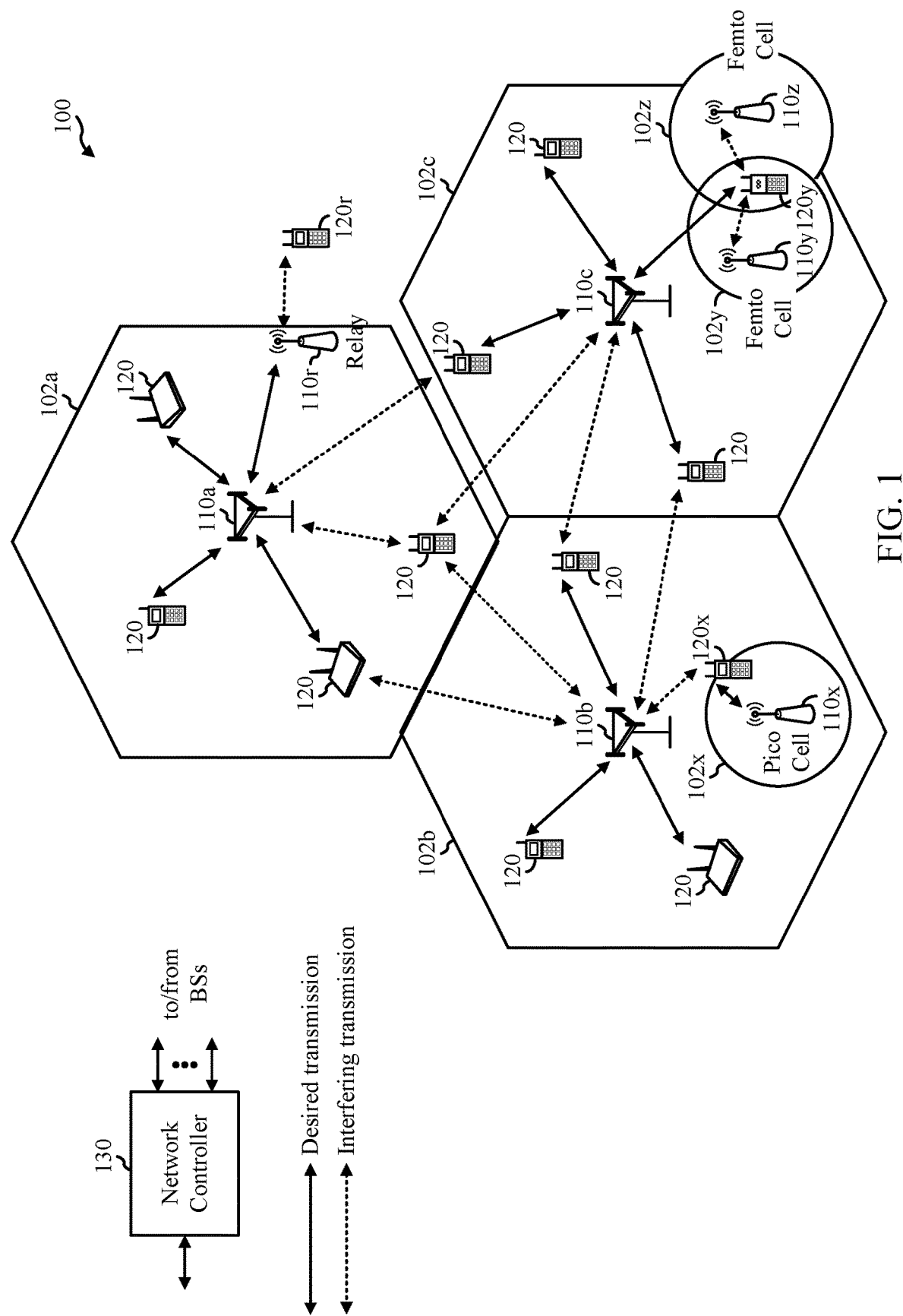
FIG. 1 is a block diagram conceptually illustrating an example telecommunications system, in accordance with certain aspects of the present disclosure.

Aspects of the present disclosure provide apparatus, methods, processing systems, and computer readable mediums for new radio (NR) (new radio access technology or 5G technology). NR may support various wireless communication services, such as Enhanced mobile broadband (eMBB) targeting wide bandwidth (e.g. 80 MHz or beyond), millimeter wave (mmW) targeting high carrier frequency (e.g. 60 GHz or beyond), massive MTC (mMTC) targeting non-backward compatible MTC techniques, and/or mission critical targeting ultra-reliable low latency communications (URLLC). These services may include latency and reliability requirements. These services may also have different transmission time intervals (TTI) to meet respective quality of service (QoS) requirements. In addition, these services may co-exist in the same subframe.

Aspects of the present disclosure provide techniques and apparatus for a link dependent scheduling request (SR) for URLLC in communication systems operating according to NR technologies. For example, for a user equipment (UE) in worse coverage (e.g., poor channel conditions), the base station (BS) may assign a more protected/conservative SR format, while for UEs in better coverage (e.g., better channel conditions), the BS may assign a less conservative SR format.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

The techniques described herein may be used for various wireless communication technologies, such as LTE, CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS).

New Radio (NR) is an emerging wireless communications technology under development in conjunction with the 5G Technology Forum (5GTF). 3GPP Long Term Evolution (LTE) and LTE-Advanced (LTE-A) are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, while aspects may be described herein using terminology commonly associated with 3G and/or 4G wireless technologies, aspects of the present disclosure can be applied in other generation-based communication systems, such as 5G and later, including NR technologies.

New radio (NR) access (e.g., 5G technology) may support various wireless communication services, such as enhanced mobile broadband (eMBB) targeting wide bandwidth (e.g., 80 MHz or beyond), millimeter wave (mmW) targeting high carrier frequency (e.g., 25 GHz or beyond), massive machine type communications MTC (mMTC) targeting non-backward compatible MTC techniques, and/or mission critical targeting ultra-reliable low-latency communications (URLLC). These services may include latency and reliability requirements. These services may also have different transmission time intervals (TTI) to meet respective quality of service (QoS) requirements. In addition, these services may co-exist in the same subframe.

Example Wireless Communications System

FIG. 1 illustrates an example wireless network 100, such as a new radio (NR) or 5G network, in which aspects of the present disclosure may be performed, for example, for a link dependent scheduling request (SR) format, as described in greater detail below. For example, BS 110 determines one or more channel conditions for a link between the BS and a UE 120. The BS 110 assigns a SR format to the UE 120 based on the one or more channel conditions. The UE 120 can receive the SR format assignment and transmit one or more SR transmissions to the BS 110 according to the assigned SR format.

As illustrated in FIG. 1, the wireless communication network 100 may include a number of base stations (BSs) 110 and other network entities. A BS may be a station that communicates with user equipments (UEs). Each BS 110 may provide communication coverage for a particular geographic area. In 3GPP, the term "cell" can refer to a coverage area of a Node B (NB) and/or a NB subsystem serving this coverage area, depending on the context in which the term is used. In NR systems, the term "cell" and next generation NodeB (gNB or gNodeB), NR BS, 5G NB, access point (AP), or transmission reception point (TRP) may be interchangeable. In some examples, a cell may not necessarily be stationary, and the geographic area of the cell may move according to the location of a mobile BS. In some examples, the base stations may be interconnected to one another and/or to one or more other base stations or network nodes (not shown) in wireless communication network 100 through various types of backhaul interfaces, such as a direct physical connection, a wireless connection, a virtual network, or the like using any suitable transport network.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs. In some cases, NR or 5G RAT networks may be deployed.

A BS may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. A BS may support one or multiple (e.g., three) cells.

Wireless communication network 100 may also include relay stations. A relay station is a station that receives a transmission of data and/or other information from an upstream station (e.g., a BS or a UE) and sends a transmission of the data and/or other information to a downstream station (e.g., a UE or a BS). A relay station may also be a UE that relays transmissions for other UEs. In the example shown in FIG. 1, a relay station 110r may communicate with the BS 110a and a UE 120r in order to facilitate communication between the BS 110a and the UE 120r. A relay station may also be referred to as a relay BS, a relay, etc.

Wireless communication network 100 may be a heterogeneous network that includes BSs of different types, e.g., macro BS, pico BS, femto BS, relays, etc. These different types of BSs may have different transmit power levels, different coverage areas, and different impact on interference in the wireless communication network 100. For example, macro BS may have a high transmit power level (e.g., 20 Watts) whereas pico BS, femto BS, and relays may have a lower transmit power level (e.g., 1 Watt).

Wireless communication network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time. The techniques described herein may be used for both synchronous and asynchronous operation.

A network controller 130 may couple to a set of BSs and provide coordination and control for these BSs. The network controller 130 may communicate with the BSs 110 via a backhaul. The BSs 110 may also communicate with one another (e.g., directly or indirectly) via wireless or wireline backhaul.

The UEs 120 (e.g., 120x, 120y, etc.) may be dispersed throughout the wireless communication network 100, and each UE may be stationary or mobile. A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block" (RB)) may be 12 subcarriers (or 180 kHz). Consequently, the nominal Fast Fourier Transfer (FFT) size may be equal to 128, 256, 512, 1024 or 2048 for system bandwidth of 1.25, 2.5, 5, 10, or 20 megahertz (MHz), respectively. The system bandwidth may also be partitioned into subbands. For example, a subband may cover 1.08 MHz (i.e., 6 resource blocks), and there may be 1, 2, 4, 8, or 16 subbands for system bandwidth of 1.25, 2.5, 5, 10 or 20 MHz, respectively.

While aspects of the examples described herein may be associated with LTE technologies, aspects of the present disclosure may be applicable with other wireless communications systems, such as NR. NR may utilize OFDM with a CP on the uplink and downlink and include support for half-duplex operation using TDD. Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

In FIG. 1, a solid line with double arrows indicates desired transmissions between a UE and a serving BS, which is a BS designated to serve the UE on the downlink and/or uplink. A finely dashed line with double arrows indicates interfering transmissions between a UE and a BS.

Figure 2:
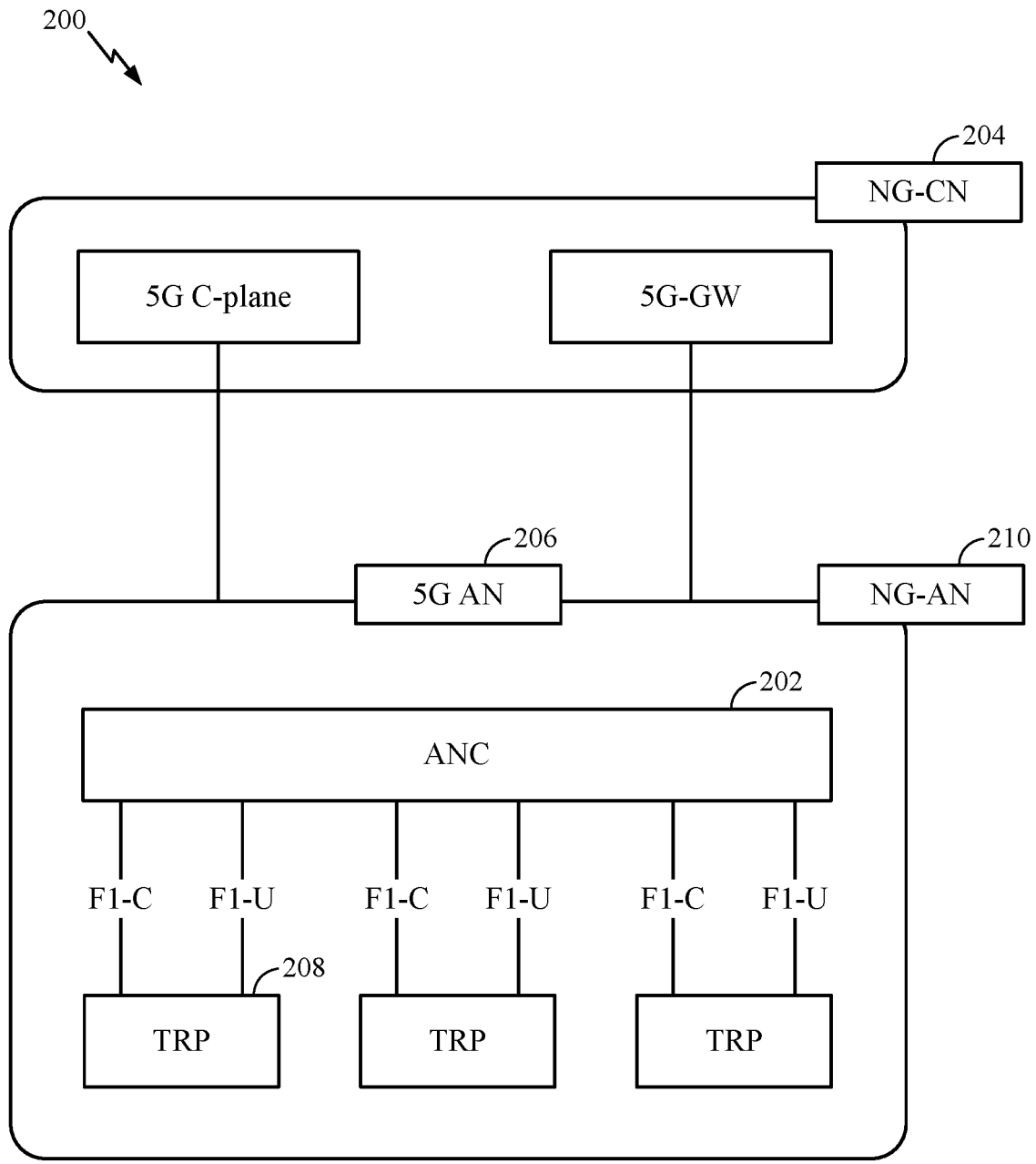
FIG. 2 is a block diagram illustrating an example logical architecture of a distributed radio access network (RAN), in accordance with certain aspects of the present disclosure.

FIG. 2 illustrates an example logical architecture of a distributed Radio Access Network (RAN) 200, which may be implemented in the wireless communication network 100 illustrated in FIG. 1. A 5G access node 206 may include an access node controller (ANC) 202. ANC 202 may be a central unit (CU) of the distributed RAN 200. The backhaul interface to the Next Generation Core Network (NG-CN) 204 may terminate at ANC 202. The backhaul interface to neighboring next generation access Nodes (NG-ANs) 210 may terminate at ANC 202. ANC 202 may include one or more TRPs 208 (e.g., cells, BSs, gNBs, etc.).

The TRPs 208 may be a distributed unit (DU). TRPs 208 may be connected to a single ANC (e.g., ANC 202) or more than one ANC (not illustrated). For example, for RAN sharing, radio as a service (RaaS), and service specific AND deployments, TRPs 208 may be connected to more than one ANC. TRPs 208 may each include one or more antenna ports. TRPs 208 may be configured to individually (e.g., dynamic selection) or jointly (e.g., joint transmission) serve traffic to a UE.

The logical architecture of distributed RAN 200 may support fronthauling solutions across different deployment types. For example, the logical architecture may be based on transmit network capabilities (e.g., bandwidth, latency, and/or jitter).

The logical architecture of distributed RAN 200 may share features and/or components with LTE. For example, next generation access node (NG-AN) 210 may support dual connectivity with NR and may share a common fronthaul for LTE and NR.

The logical architecture of distributed RAN 200 may enable cooperation between and among TRPs 208, for example, within a TRP and/or across TRPs via ANC 202. An inter-TRP interface may not be used.

Logical functions may be dynamically distributed in the logical architecture of distributed RAN 200. As will be described in more detail with reference to FIG. 5, the Radio Resource Control (RRC) layer, Packet Data Convergence Protocol (PDCP) layer, Radio Link Control (RLC) layer, Medium Access Control (MAC) layer, and a Physical (PHY) layers may be adaptably placed at the DU (e.g., TRP 208) or CU (e.g., ANC 202).

Figure 3:
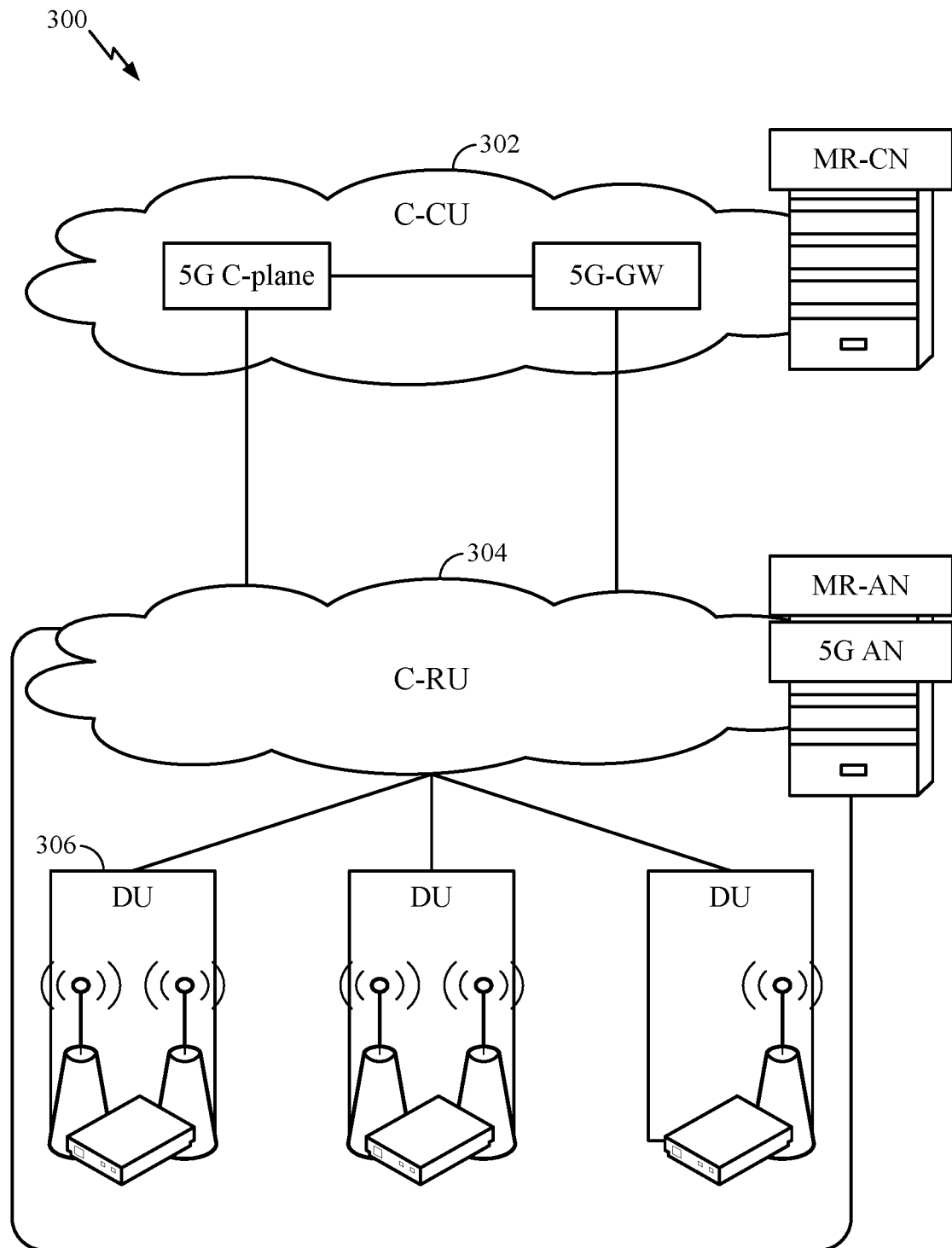
FIG. 3 is a diagram illustrating an example physical architecture of a distributed RAN, in accordance with certain aspects of the present disclosure.

FIG. 3 illustrates an example physical architecture of a distributed RAN 300, according to aspects of the present disclosure. A centralized core network unit (C-CU) 302 may host core network functions. C-CU 302 may be centrally deployed. C-CU 302 functionality may be offloaded (e.g., to advanced wireless services (AWS)), in an effort to handle peak capacity.

A centralized RAN unit (C-RU) 304 may host one or more ANC functions. Optionally, the C-RU 304 may host core network functions locally. The C-RU 304 may have distributed deployment. The C-RU 304 may be close to the network edge.

A DU 306 may host one or more TRPs (Edge Node (EN), an Edge Unit (EU), a Radio Head (RH), a Smart Radio Head (SRH), or the like). The DU may be located at edges of the network with radio frequency (RF) functionality.

Figure 4:
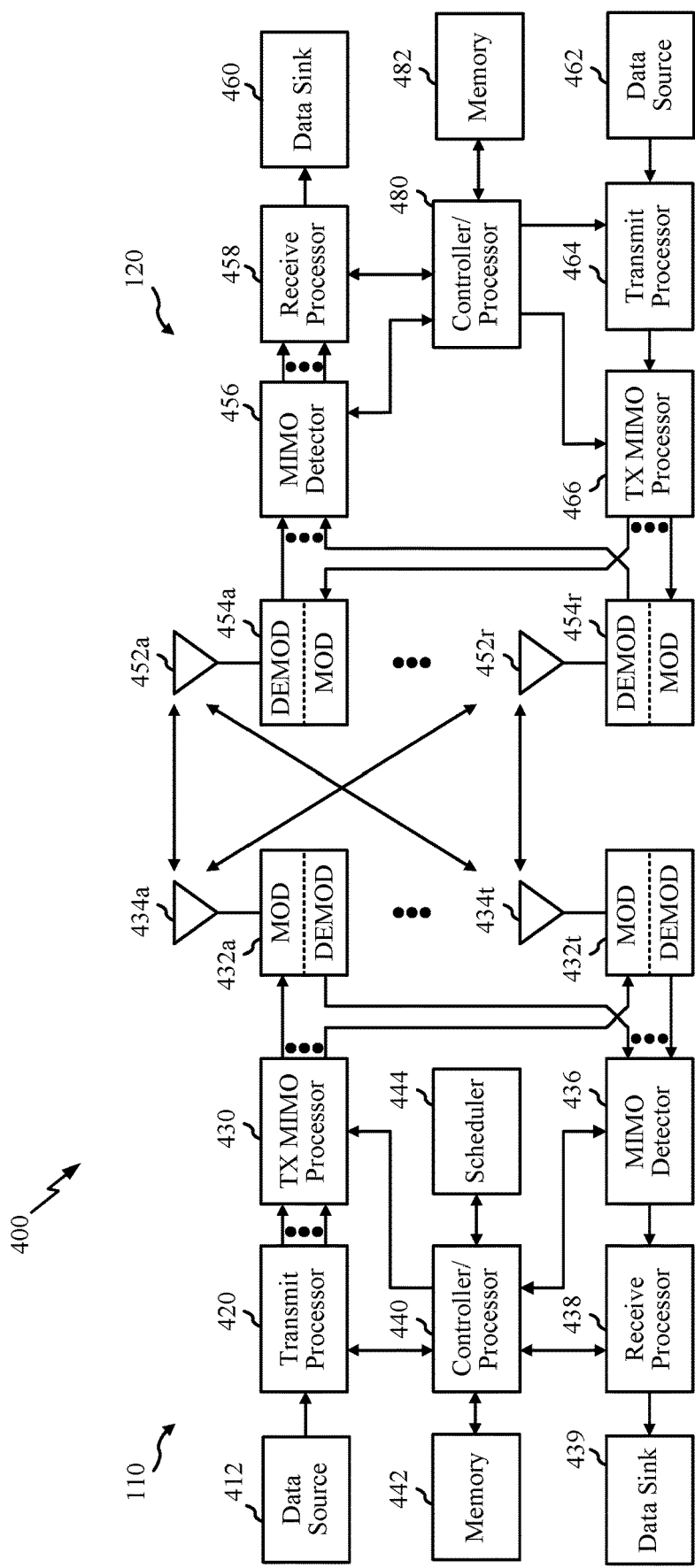
FIG. 4 is a block diagram conceptually illustrating a design of an example base station (BS) and user equipment (UE), in accordance with certain aspects of the present disclosure.

FIG. 4 illustrates example components of BS 110 and UE 120 (as depicted in FIG. 1), which may be used to implement aspects of the present disclosure. For example, antennas 452, processors 466, 458, 464, and/or controller/processor 480 of the UE 120 and/or antennas 434, processors 420, 430, 438, and/or controller/processor 440 of the BS 110 may be used to perform the various techniques and methods described herein for a link dependent SR format for URLCC.

At the BS 110, a transmit processor 420 may receive data from a data source 412 and control information from a controller/processor 440. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. The processor 420 may process (e.g., encode and symbol map) the data and control information to obtain data symbols and control symbols, respectively. The processor 420 may also generate reference symbols, e.g., for the primary synchronization signal (PSS), secondary synchronization signal (SSS), and cell-specific reference signal (CRS). A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODs) 432a through 432t. Each modulator 432 may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from modulators 432a through 432t may be transmitted via the antennas 434a through 434t, respectively.

At the UE 120, the antennas 452a through 452r may receive the downlink signals from the base station 110 and may provide received signals to the demodulators (DEMODs) in transceivers 454a through 454r, respectively. Each demodulator 454 may condition (e.g., filter, amplify, downconvert, and digitize) a respective received signal to obtain input samples. Each demodulator may further process the input samples (e.g., for OFDM, etc.) to obtain received symbols. A MIMO detector 456 may obtain received symbols from all the demodulators 454a through 454r, perform MIMO detection on the received symbols if applicable, and provide detected symbols. A receive processor 458 may process (e.g., demodulate, deinterleave, and decode) the detected symbols, provide decoded data for the UE 120 to a data sink 460, and provide decoded control information to a controller/processor 480.

On the uplink, at UE 120, a transmit processor 464 may receive and process data (e.g., for the physical uplink shared channel (PUSCH)) from a data source 462 and control information (e.g., for the physical uplink control channel (PUCCH) from the controller/processor 480. The transmit processor 464 may also generate reference symbols for a reference signal (e.g., for the sounding reference signal (SRS)). The symbols from the transmit processor 464 may be precoded by a TX MIMO processor 466 if applicable, further processed by the demodulators in transceivers 454a through 454r (e.g., for SC-FDM, etc.), and transmitted to the base station 110. At the BS 110, the uplink signals from the UE 120 may be received by the antennas 434, processed by the modulators 432, detected by a MIMO detector 436 if applicable, and further processed by a receive processor 438 to obtain decoded data and control information sent by the UE 120. The receive processor 438 may provide the decoded data to a data sink 439 and the decoded control information to the controller/processor 440.

The controllers/processors 440 and 480 may direct the operation at the BS 110 and the UE 120, respectively. The processor 440 and/or other processors and modules at the BS 110 may perform or direct the execution of processes for the techniques described herein. The memories 442 and 482 may store data and program codes for BS 110 and UE 120, respectively. A scheduler 444 may schedule UEs for data transmission on the downlink and/or uplink.

Figure 5:
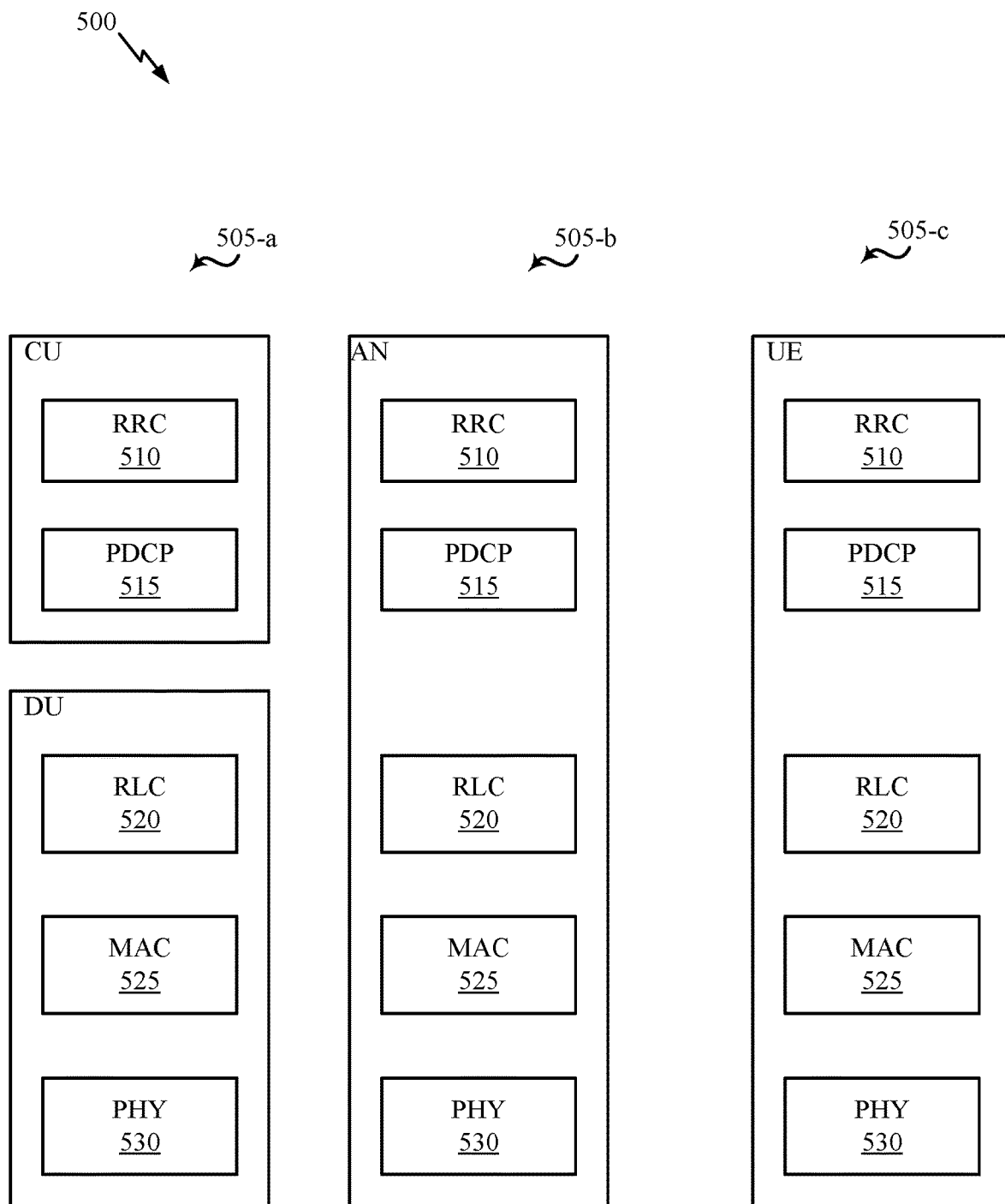
FIG. 5 is a diagram showing examples for implementing a communication protocol stack, in accordance with certain aspects of the present disclosure.

FIG. 5 illustrates a diagram 500 showing examples for implementing a communications protocol stack, according to aspects of the present disclosure. The illustrated communications protocol stacks may be implemented by devices operating in a wireless communication system, such as a 5G system (e.g., a system that supports uplink-based mobility). Diagram 500 illustrates a communications protocol stack including a RRC layer 510, a PDCP layer 515, a RLC layer 520, a MAC layer 525, and a PHY layer 530. In various examples, the layers of a protocol stack may be implemented as separate modules of software, portions of a processor or ASIC, portions of non-collocated devices connected by a communications link, or various combinations thereof. Collocated and non-collocated implementations may be used, for example, in a protocol stack for a network access device (e.g., ANs, CUs, and/or DUs) or a UE.

A first option 505-*a* shows a split implementation of a protocol stack, in which implementation of the protocol stack is split between a centralized network access device (e.g., an ANC 202 in FIG. 2) and distributed network access device (e.g., DU 208 in FIG. 2). In the first option 505-*a*, an RRC layer 510 and a PDCP layer 515 may be implemented by the central unit, and an RLC layer 520, a MAC layer 525, and a PHY layer 530 may be implemented by the DU. In various examples the CU and the DU may be collocated or non-collocated. The first option 505-*a* may be useful in a macro cell, micro cell, or pico cell deployment.

A second option 505-*b* shows a unified implementation of a protocol stack, in which the protocol stack is implemented in a single network access device. In the second option, RRC layer 510, PDCP layer 515, RLC layer 520, MAC layer 525, and PHY layer 530 may each be implemented by the AN. The second option 505-*b* may be useful in, for example, a femto cell deployment.

Regardless of whether a network access device implements part or all of a protocol stack, a UE may implement an entire protocol stack as shown in 505-c (e.g., the RRC layer 510, the PDCP layer 515, the RLC layer 520, the MAC layer 525, and the PHY layer 530).

In LTE, the basic transmission time interval (TTI) or packet duration is the 1 ms subframe. In NR, a subframe is still 1 ms, but the basic TTI is referred to as a slot. A subframe contains a variable number of slots (e.g., 1, 2, 4, 8, 16, . . . slots) depending on the subcarrier spacing. The NR RB is 12 consecutive frequency subcarriers. NR may support a base subcarrier spacing of 15 KHz and other subcarrier spacing may be defined with respect to the base subcarrier spacing, for example, 30 kHz, 60 kHz, 120 kHz, 240 kHz, etc. The symbol and slot lengths scale with the subcarrier spacing. The CP length also depends on the subcarrier spacing.

Figure 6:
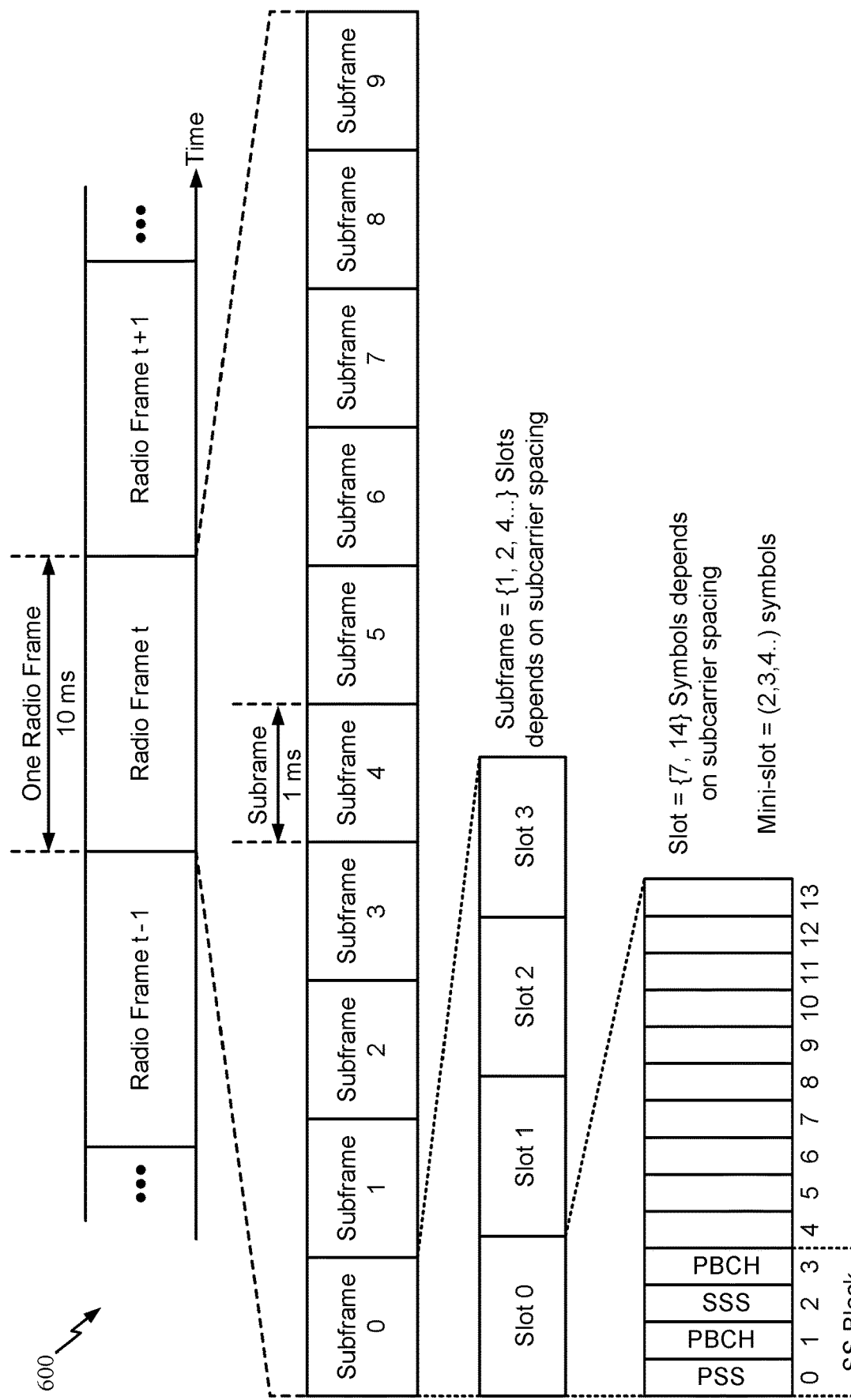
FIG. 6 illustrates an example of a frame format for a new radio (NR) system, in accordance with certain aspects of the present disclosure.

FIG. 6 is a diagram showing an example of a frame format 600 for NR. The transmission timeline for each of the downlink and uplink may be partitioned into units of radio frames. Each radio frame may have a predetermined duration (e.g., 10 ms) and may be partitioned into 10 subframes, each of 1 ms, with indices of 0 through 9. Each subframe may include a variable number of slots depending on the subcarrier spacing. Each slot may include a variable number of symbol periods (e.g., 7 or 14 symbols) depending on the subcarrier spacing. The symbol periods in each slot may be assigned indices. A mini-slot, which may be referred to as a sub-slot structure, refers to a transmit time interval having a duration less than a slot (e.g., 2, 3, or 4 symbols).

Each symbol in a slot may indicate a link direction (e.g., DL, UL, or flexible) for data transmission and the link direction for each subframe may be dynamically switched. The link directions may be based on the slot format. Each slot may include DL/UL data as well as DL/UL control information.

In NR, a synchronization signal (SS) block is transmitted. The SS block includes a PSS, a SSS, and a two symbol PBCH. The SS block can be transmitted in a fixed slot location, such as the symbols 0-3 as shown in FIG. 6. The PSS and SSS may be used by UEs for cell search and acquisition. The PSS may provide half-frame timing, the SS may provide the CP length and frame timing. The PSS and SSS may provide the cell identity. The PBCH carries some basic system information, such as downlink system bandwidth, timing information within radio frame, SS burst set periodicity, system frame number, etc. The SS blocks may be organized into SS bursts to support beam sweeping. Further system information such as, remaining minimum system information (RMSI), system information blocks (SIBs), other system information (OSI) can be transmitted on a physical downlink shared channel (PDSCH) in certain subframes. The SS block can be transmitted up to sixty-four times, for example, with up to sixty-four different beam directions for mmW. The up to sixty-four transmissions of the SS block are referred to as the SS burst set. SS blocks in an SS burst set are transmitted in the same frequency region, while SS blocks in different SS bursts sets can be transmitted at different frequency locations.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

A UE may operate in various radio resource configurations, including a configuration associated with transmitting pilots using a dedicated set of resources (e.g., a radio resource control (RRC) dedicated state, etc.) or a configuration associated with transmitting pilots using a common set of resources (e.g., an RRC common state, etc.). When operating in the RRC dedicated state, the UE may select a dedicated set of resources for transmitting a pilot signal to a network. When operating in the RRC common state, the UE may select a common set of resources for transmitting a pilot signal to the network. In either case, a pilot signal transmitted by the UE may be received by one or more network access devices, such as an AN, or a DU, or portions thereof. Each receiving network access device may be configured to receive and measure pilot signals transmitted on the common set of resources, and also receive and measure pilot signals transmitted on dedicated sets of resources allocated to the UEs for which the network access device is a member of a monitoring set of network access devices for the UE. One or more of the receiving network access devices, or a CU to which receiving network access device(s) transmit the measurements of the pilot signals, may use the measurements to identify serving cells for the UEs, or to initiate a change of serving cell for one or more of the UEs.

Example Link-Dependent SR Format for URLLC

Aspects of the present disclosure provide apparatus, methods, processing systems, and computer readable mediums for new radio (NR) (new radio access technology or 5G technology). As mentioned above, NR supports various wireless communication services, such as Enhanced mobile broadband (eMBB) targeting wide bandwidth (e.g., 80 MHz or beyond), millimeter wave (mmW) targeting high carrier frequency (e.g. 60 GHz or beyond), massive MTC (mMTC) targeting non-backward compatible MTC techniques, and/or mission critical targeting ultra-reliable low latency communications (URLLC). These services may include latency and reliability requirements. These services may also have different transmission time intervals (TTI) to meet respective quality of service (QoS) requirements. In addition, these services may co-exist in the same subframe.

Scheduling requests (SR) can be used for requesting resources (e.g., uplink shared resources) for uplink transmission. For example, the UE (e.g., such as a UE 120 in the wireless communication network 100) can send a SR to the base station (e.g., such as a BS 110 in the wireless communication network 100, which may be a next generation Node B (gNB)), to request UL-SCH resources for a URLLC transmission.

In certain systems (e.g., long term evolution (LTE) systems), the BS configures the UE with an SR configuration (e.g., referred to as the SR format). The BS can configure the SR format via radio resource control (RRC) signaling (e.g., semi-static). The UE can transmit the SR on the physical uplink control channel (PUCCH). In LTE, the UE is configured with periodic resources for the SR. Thus, once the UE has uplink data to send, it waits until the periodic SR resources are available to transmit the SR to the BS. In some examples, the SR is triggered at the UE medium access control (MAC) layer when a regular buffer status report (BSR) is triggered and the UE does not already have uplink resources for transmission of at least the regular BSR. The regular BSR can be triggered when data becomes available for uplink transmission.

Once the BS receives the SR, the BS sends the UE an uplink grant (e.g., in downlink control information (DCI), such as a DCI 0) to schedule resources for the UE. After the UE gets the uplink grant, the UE can transmit the physical uplink shared channel (PUSCH) according to the grant. The timing of the SR, uplink grant, and PUSCH transmission varies based on whether the system uses frequency division duplexing (FDD) or time division duplexing (TDD).

As mentioned above, certain systems, such as NR support URLCC. ULRRC may have tight reliability and latency targets for both control and data channels. For example, URLLC may have a target block error rate (BLER) of around $10^{-5}$ or lower (e.g., $10^{-9}$) and a target latency of less than 2 milliseconds. Thus, unlike for the LTE case described above, for URLLC, the UE may transmit SR instantaneously (e.g., rather than periodically). For example, once the BSR is triggered by the new arrival of a packet (e.g., in the UE buffer), the UE sends the SR immediately, instead of waiting for configured periodic SR resource.

Because the UE transmits the SR instantaneously rather than on configured periodic resources, there may be interference. It may be more difficult for a UE with a worse link, such as a cell-edge UE with poor coverage, to achieve the target reliability for URLLC transmissions. Therefore, it may be desirable for the SR format to be dependent on the quality of the link.

Accordingly, aspects of the present disclosure provide link-dependent SR formats for URLLC, for example, in NR communications systems. For example, the BS may assign more protected and/or conservative SR format to a UE having a worse link. This may help the UE to achieve the target high-reliability for URLLC. The SR formats for the UEs having worse links, such as cell-edge UEs, may carry lower payload and/or may use dedicated/exclusive resources, etc.

Figure 7:
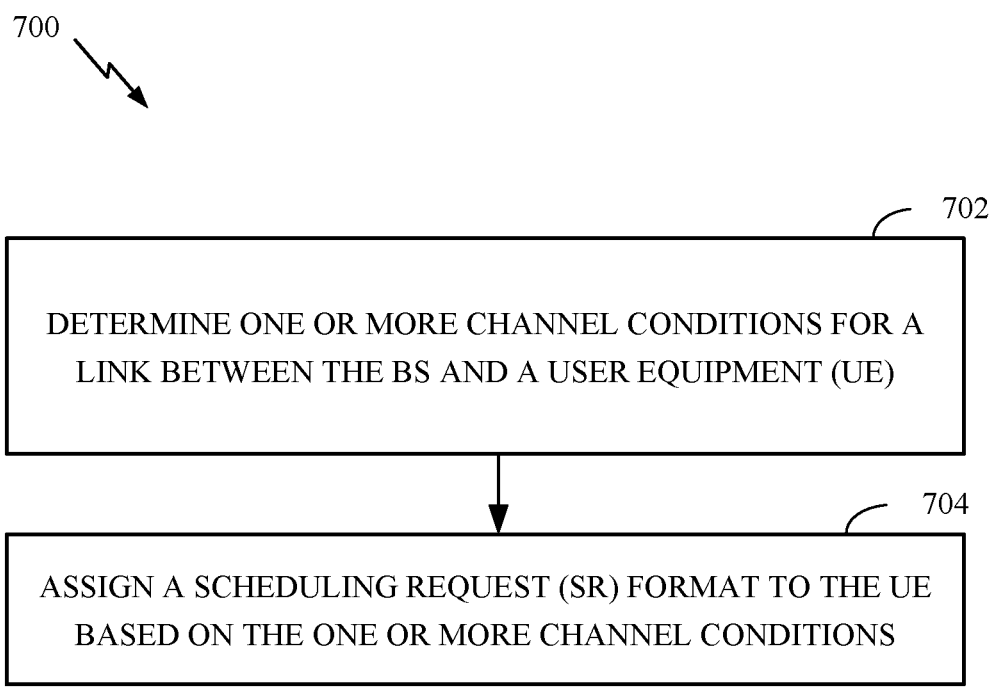
FIG. 7 illustrates example operations for wireless communications performed by a BS for link dependent scheduling request (SR) format, in accordance with certain aspects of the present disclosure.

FIG. 7 illustrates example operations 700 for wireless communications, in accordance with aspects of the present disclosure. Operations 700 may be performed, for example, by a BS (e.g., such as a BS 110 in the wireless communication network 100 shown in FIG. 1).

Operations 700 begin, at block 702, by determining one or more channel conditions (e.g., channel quality) for a link between the BS and a UE. For example, the BS may determine the channel conditions based on a location (e.g., distance) of the UE relative to the BS (e.g., a UE at the cell-edge or near to the BS), based on measurements at the BS, and/or based on measurement reports from the UE.

At block 704, the BS assigns (e.g., semi-statically via RRC or dynamically via DCI in PDCCH) a SR format to the UE based on the one or more channel conditions. The SR format may be one of a plurality of SR formats (e.g., N configured SR formats) configured at the UE. According to certain aspects, the SR format can be assigned for a group of UEs.

According to certain aspects, the SR format can be assigned for URLLC communications. The BS may determine/know that the UE is configured for (e.g., supports) URLLC communications. For example, the UE may indicate during an association procedure with the BS that the UE is URLLC capable. The SR format may be further based on the determination that the UE supports URLLC.

The SR format may define, in some non-limiting examples, a payload size associated with the SR, a resource allocation and/or RA size associated with the SR, a sequence, sequence type, and/or sequence length associated with the SR, a multiplexing level associated with the SR, and/or a cyclic prefix (CP) length associated with the SR. The multiplexing level may refer to a number of signals that the SR transmission is multiplexed with. For example, the SR may be multiplexed with eMBB uplink control information, such as channel state information (CSI), hybrid automatic repeat request (HARQ) feedback (e.g., ACK/NACK), eMBB SR, etc.

According to certain aspects, the BS assigns UEs with worse channel conditions to more protected/conservative SR format (e.g., to improve link budget). For example, the BS assigns a SR format associated with a larger payload size, a larger RA, a larger SR sequence length, a higher SR multiplexing level, a longer CP, and/or a demodulation reference signal (DMRS) sequence type (e.g., for coherent channel detection since the channel is good) for a UE having better channel conditions, while the BS assigns a SR format associated with a smaller payload size (e.g., 1 bit), a smaller RA, a shorter SR sequence length (e.g., Chu sequence), a lower SR multiplexing level, a shorter CP, and/or a non-DMRS sequence type for UE having worse channel conditions.

Figure 8:
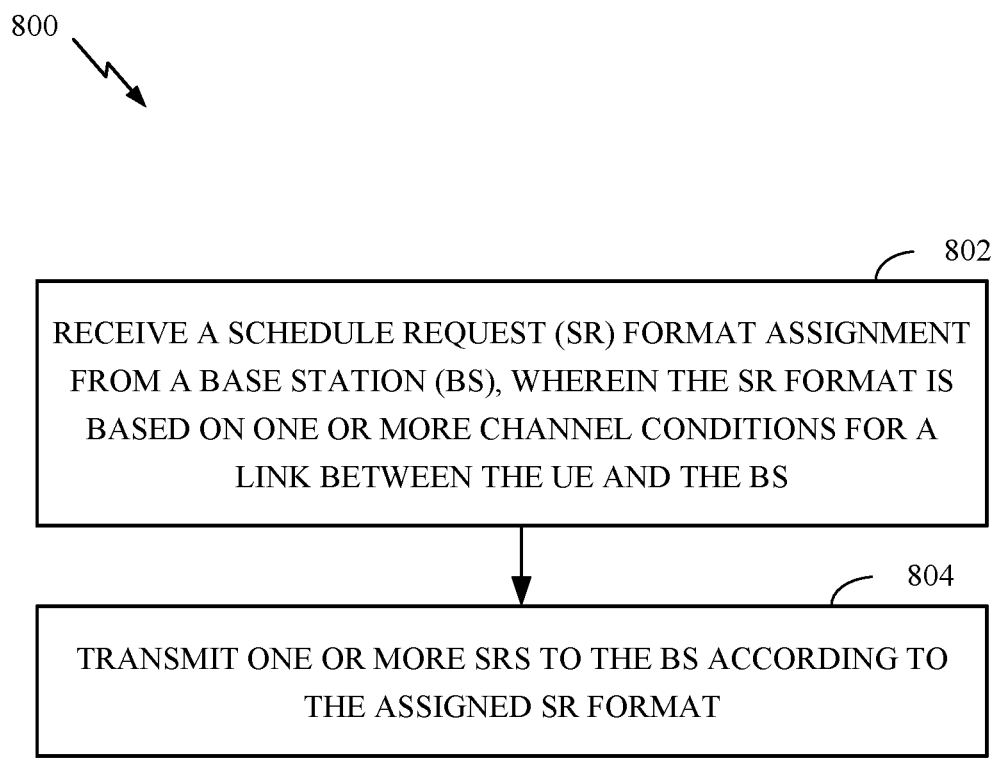
FIG. 8 illustrates example operations for wireless communications performed by a UE for transmitting SR according to the link dependent SR format, in accordance with certain aspects of the present disclosure.

FIG. 8 illustrates example operations 800 for wireless communications, in accordance with aspects of the present disclosure. Operations 800 may be performed, for example, by a UE (e.g., such as a UE 120 in the wireless communication network 100 shown in FIG. 1). Operations 800 may be complementary operations performed by the UE to the operations 700 performed by the BS.

Operations 800 begin, at block 802, by receiving a SR format assignment from a BS. The SR format is based on one or more channel conditions for a link between the UE and the BS. The UE may be configured with multiple different SR formats and may receive an indication of one of the SR formats to use. In aspects, the UE may indicate that the UE is configured for URLLC communications, such as during an association with the BS. In aspects, the UE performs channel quality measurements and sends reports to the BS. The assigned SR format can be based on the reports.

At block 804, the UE transmits one or more SRs to the BS according to the assigned SR format. The SRs may be transmitted upon arrival of data in a buffer of the UE. The SRs may be transmitted instantaneously, for example, not periodically.

SR transmissions may collide with other transmission in a subframe. For example, the SR transmissions may collide depending on the SR type/format (URLLC, non-URLLC, multi-bit SR, single-bit SR, etc.). In LTE, when SR is due in the same subframe as CSI, depending on PUCCH formats, SR may be dropped (e.g., for PUCCH format 1 or 2), or multiplexed with CSI (e.g., for PUCCH format 3, 4 or 5). For URLLC SR, the UE may always drop CSI or may always drop eMBB UCI (e.g., CSI and/or ACK/NACK.

According to certain aspects, for small cell environments, a universal SR format may be used (e.g., regardless of the link). Alternatively, a small number of different SR formats can be configured and assigned based on the link. This can reduce the SR format signaling overhead.

Advantageously, techniques provided herein may enable an apparatus (e.g., a BS, such as a gNB) to assign SR formats based on the quality of link. Thus, UE in poor channel conditions can be assigned an appropriate SR format that will help the UE achieve the high reliability targets for URLLC communications.

Figure 9:
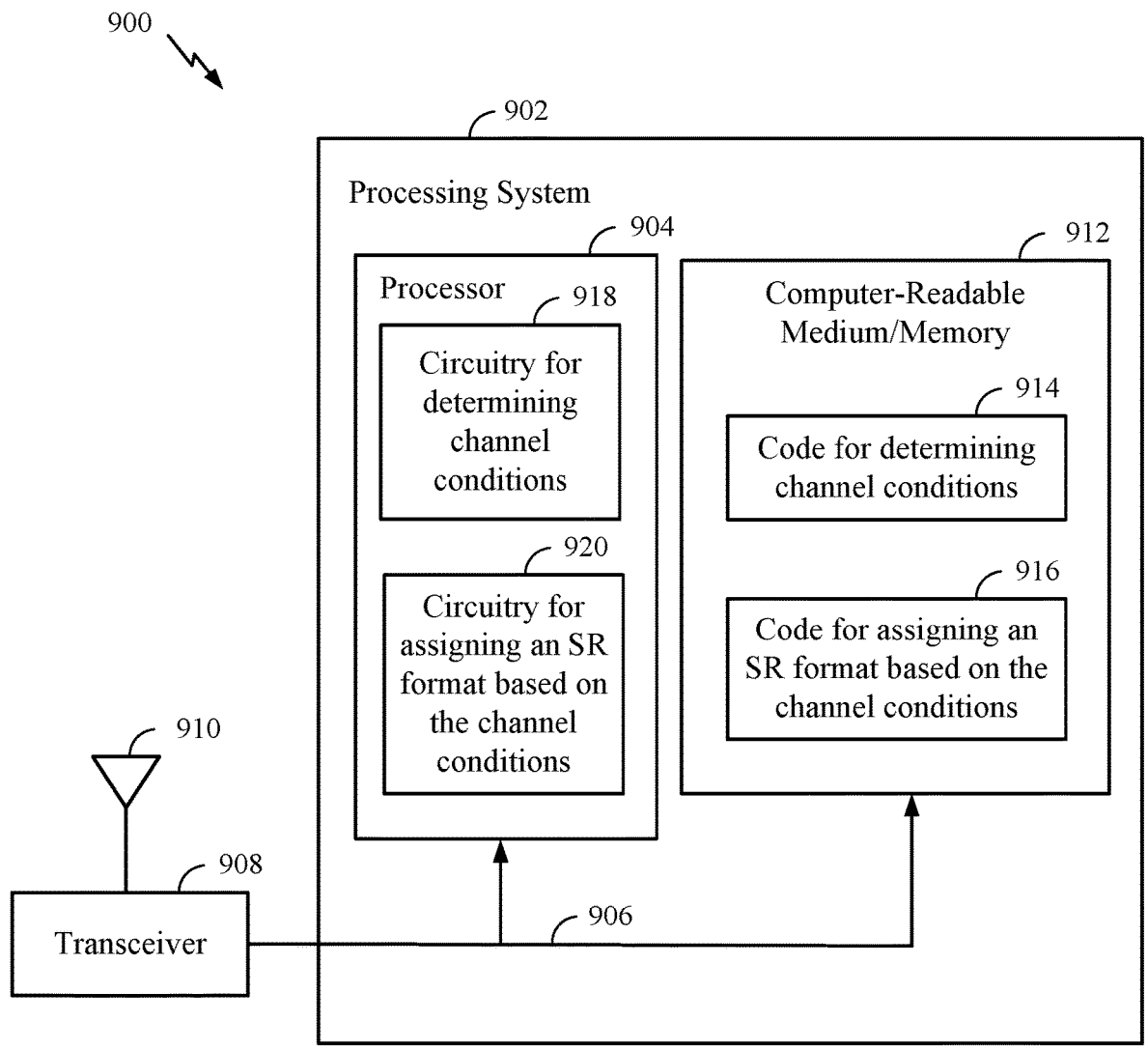
FIG. 9 illustrates a communications device that may include various components configured to perform operations for the techniques disclosed herein in accordance with aspects of the present disclosure.

FIG. 9 illustrates a communications device 900 that may include various components (e.g., corresponding to means-plus-function components) configured to perform operations for the techniques disclosed herein, such as the operations illustrated in FIG. 7. The communications device 900 includes a processing system 902 coupled to a transceiver 908. The transceiver 908 is configured to transmit and receive signals for the communications device 900 via an antenna 910, such as the various signals as described herein. The processing system 902 may be configured to perform processing functions for the communications device 900, including processing signals received and/or to be transmitted by the communications device 900.

The processing system 902 includes a processor 904 coupled to a computer-readable medium/memory 912 via a bus 906. In certain aspects, the computer-readable medium/memory 912 is configured to store instructions (e.g., computer executable code) that when executed by the processor 904, cause the processor 904 to perform the operations illustrated in FIG. 7, or other operations for performing the various techniques discussed herein for link-dependent SR formats. In certain aspects, computer-readable medium/memory 912 stores code 914 for determining channel conditions and code 916 for assigning an SR format based on the channel conditions. In certain aspects, the processor 904 has circuitry configured to implement the code stored in the computer-readable medium/memory 912. The processor 904 includes circuitry 918 for determining channel conditions and circuitry 920 for assigning an SR format based on the channel conditions.

Figure 10:
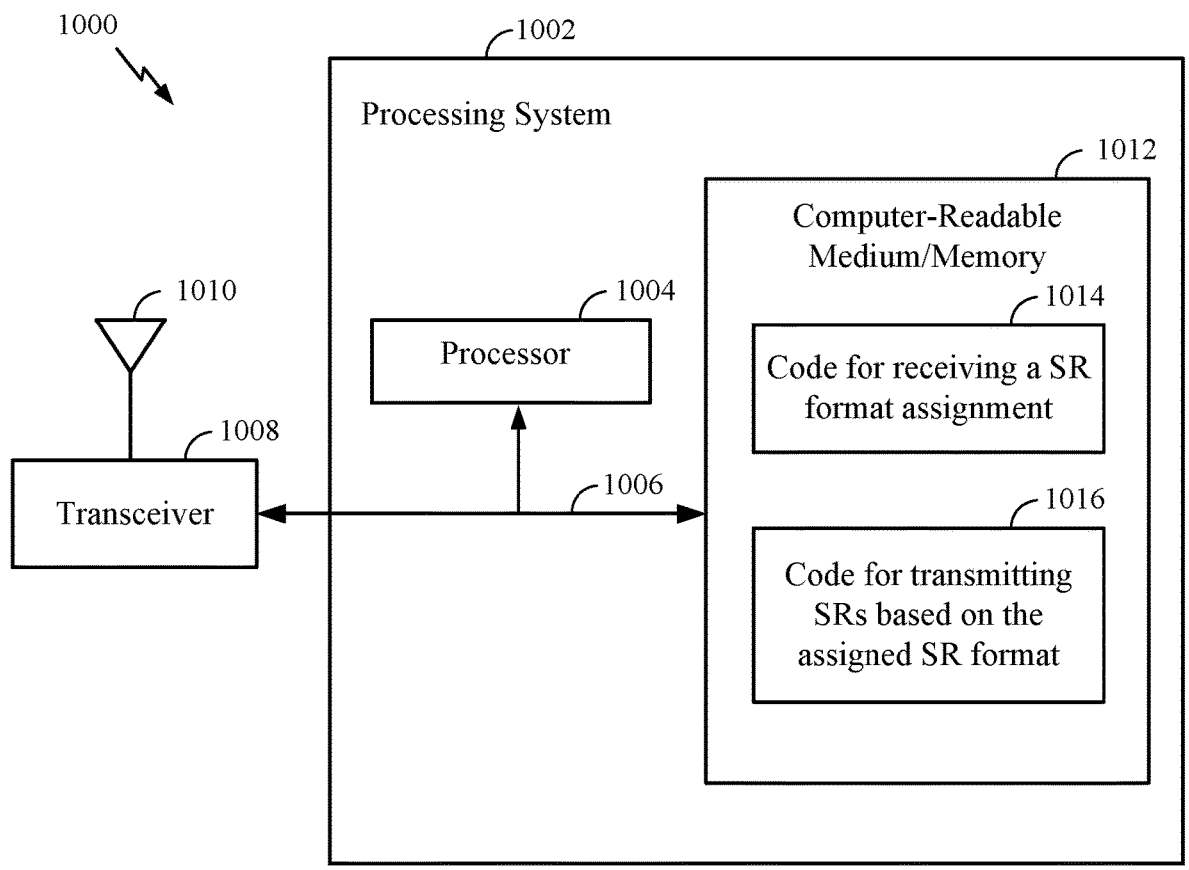
FIG. 10 illustrates another communications device that may include various components configured to perform operations for the techniques disclosed herein in accordance with aspects of the present disclosure.

FIG. 10 illustrates a communications device 1000 that may include various components (e.g., corresponding to means-plus-function components) configured to perform operations for the techniques disclosed herein, such as the operations illustrated in FIG. 8. The communications device 1000 includes a processing system 1002 coupled to a transceiver 1008. The transceiver 1008 is configured to transmit and receive signals for the communications device 1000 via an antenna 1010, such as the various signals as described herein. The processing system 1002 may be configured to perform processing functions for the communications device 1000, including processing signals received and/or to be transmitted by the communications device 1000.

The processing system 1002 includes a processor 1004 coupled to a computer-readable medium/memory 1012 via a bus 1006. In certain aspects, the computer-readable medium/memory 1012 is configured to store instructions (e.g., computer executable code) that when executed by the processor 1004, cause the processor 1004 to perform the operations illustrated in FIG. 8, or other operations for performing the various techniques discussed herein for link-dependent SR formats. In certain aspects, computer-readable medium/memory 1012 stores code 1014 for receiving an SR format assignment and code 1016 for transmitting SRs based on the assigned SR format. In certain aspects, the processor 1004 has circuitry configured to implement the code stored in the computer-readable medium/memory 1012. The transceiver 1008 is configured to receive a SR format assignment and transmit SRs based on the assigned SR format.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module.

Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For example, instructions for performing the operations described herein and illustrated in FIGS. 7 and 8.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for wireless communications by a base station (BS), comprising:
configuring a user equipment (UE) with a plurality of scheduling request (SR) formats, each of the SR formats defining a payload size, a sequence length, a multiplexing level, a cyclic prefix (CP) length, and a sequence type for transmitting a SR for ultra-reliable low-latency communication (URLLC) when a buffer status report (BSR) is triggered at the UE without waiting for a periodic SR resource;

determining one or more channel conditions for a link between the BS and the UE; and assigning one of the plurality of configured SR formats to the UE based on the determined one or more channel conditions.

2. The method of claim 1, wherein assigning one of the plurality of configured SR formats comprises at least one of:

assigning one of the plurality of configured SR formats semi-statically via radio resource control (RRC) signaling; or assigning one of the plurality of configured SR formats dynamically via downlink control information (DCI).

3. The method of claim 1, further comprising:

determining the UE is configured for URLLC, wherein the one of the plurality of configured SR formats is assigned further based on the determination the UE is configured for URLLC.

4. The method of claim 1, wherein assigning one of the plurality of configured SR formats based on the one or more channel conditions comprises assigning an SR format that defines at least one of:

a larger SR payload size for better channel conditions and a smaller SR payload size for worse channel conditions;

a larger SR resource allocation size for better channel conditions and a smaller SR resource allocation size for worse channel conditions;

a larger SR sequence length for better channel conditions and a shorter SR sequence length for worse channel conditions;

a higher SR multiplexing level for better channel conditions and a lower SR multiplexing level for worse channel conditions;

a longer SR cyclic prefix (CP) length for better channel conditions and a shorter SR CP length for worse channel conditions; or a demodulation reference signal (DMRS) SR sequence type for better channel conditions and a non-DMRS SR sequence type for worse channel conditions.

5. The method of claim 1, wherein determining the one or more channel conditions is based on at least one of: one or more reports from the UE or a distance of the UE from the BS.

6. A method for wireless communications by a user equipment (UE), comprising:

receiving, from a base station (BS), an assignment of one of a plurality of scheduling request (SR) formats, each of the SR formats defining a payload size, a sequence length, a multiplexing level, a cyclic prefix (CP) length, and a sequence type for transmitting a SR for ultra-reliable low-latency communication (URLLC), and the assignment of the one of the plurality of SR formats being based on one or more channel conditions for a link between the UE and the BS;

determining a buffer status report (BSR) is triggered at the UE; and transmitting one or more SRs to the BS according to the assigned SR format when the BSR is triggered at the UE and without waiting for a periodic SR resource.

7. The method of claim 6, wherein receiving the assignment of the one of the plurality of SR formats comprises at least one of:

receiving the assignment semi-statically via radio resource control (RRC) signaling; or receiving the assignment dynamically via downlink control information (DCI).

8. The method of claim 6, further comprising:

indicating during an association procedure with the BS that the UE is configured for URLLC, wherein the assignment is further based on the indication that the UE is configured for URLLC.

9. The method of claim 6, wherein receiving the assigned one of the plurality of SR formats based on the one or more channel conditions comprises receiving an assigned SR format defining at least one of:

a larger SR payload size for better channel conditions and a smaller SR payload size for worse channel conditions;

a larger SR resource allocation size for better channel conditions and a smaller SR resource allocation size for worse channel conditions;

a larger SR sequence length for better channel conditions and a shorter SR sequence length for worse channel conditions;

a higher SR multiplexing level for better channel conditions and a lower SR multiplexing level for worse channel conditions;

a longer SR cyclic prefix (CP) length for better channel conditions and a shorter SR CP length for worse channel conditions; or a demodulation reference signal (DMRS) SR sequence type for better channel conditions and a non-DMRS SR sequence type for worse channel conditions.

10. The method of claim 6, further comprising:

transmitting one or more reports to the BS indicating the one or more channel conditions, wherein the assignment of the one of the plurality of configured SR formats is based at least in part on the one or more reports.

11. The method of claim 6, wherein the BSR is triggered upon arrival of data in a buffer of the UE.

12. The method of claim 6, further comprising:

determining whether to drop one or more uplink control information (UCI) bits or multiplex the one or more UCI bits with SR if the one or more UCI bits collide with SR transmission in a subframe based on at least one of the assigned one of the plurality of SR formats or a type of service associated with the UCI.

13. The method of claim 12, wherein:

the one or more UCI bits includes channel state information (CSI); and the determination comprises always determining to drop the CSI if the CSI is for enhanced mobile broadband (eMBB) service.

14. An apparatus for wireless communications, comprising:

means for configuring a user equipment (UE) with a plurality of scheduling request (SR) formats, each of the SR formats defining a payload size, a sequence length, a multiplexing level, a cyclic prefix (CP) length, and a sequence type for transmitting a SR for ultra-reliable low-latency communication (URLLC) when a buffer status report (BSR) is triggered at the UE without waiting for a periodic SR resource;

means for determining one or more channel conditions for a link between the apparatus and the UE; and means for assigning one of the plurality of configured SR formats to the UE based on the one or more channel conditions.

15. The apparatus of claim 14, wherein means for assigning one of a plurality of configured SR formats comprises at least one of:
   means for assigning one of the plurality of configured SR formats semi-statically via radio resource control (RRC) signaling; or
   means for assigning one of the plurality of configured SR formats dynamically via downlink control information (DCI).

16. The apparatus of claim 14, further comprising:
   means for determining the UE is configured for URLLC, wherein one of the plurality of configured SR formats is assigned further based on the determination the UE is configured for URLLC.

17. The apparatus of claim 14, wherein means for assigning one of the plurality of SR formats based on the one or more channel conditions comprises means for assigning an SR format that defines at least one of:
   a larger SR payload size for better channel conditions and a smaller SR payload size for worse channel conditions;
   a larger SR resource allocation size for better channel conditions and a smaller SR resource allocation size for worse channel conditions;
   a larger SR sequence length for better channel conditions and a shorter SR sequence length for worse channel conditions;
   a higher SR multiplexing level for better channel conditions and a lower SR multiplexing level for worse channel conditions;
   a longer SR cyclic prefix (CP) length for better channel conditions and a shorter SR CP length for worse channel conditions; or
   a demodulation reference signal (DMRS) SR sequence type for better channel conditions and a non-DMRS SR sequence type for worse channel conditions.

18. The apparatus of claim 14, wherein determining the one or more channel conditions is based on at least one of: one or more reports from the UE or a distance of the UE from the apparatus.

19. An apparatus for wireless communications, comprising:
   means for receiving, from a base station (BS), an assignment of one of a plurality of scheduling request (SR) formats, each of the SR formats defining a payload size, a sequence length, a multiplexing level, a cyclic prefix (CP) length, and a sequence type for transmitting a SR for ultra-reliable low-latency communication (URLLC), and the assignment of the one of the plurality of SR formats being based on one or more channel conditions for a link between the apparatus and the BS;
   means for determining a buffer status report (BSR) is triggered at the apparatus; and
   means for transmitting one or more SRs to the BS according to the assignment of the assignment of the one of the plurality of SR formats when the BSR is triggered at the apparatus and without waiting for a periodic SR resource.

20. The apparatus of claim 19, wherein means for receiving the assignment of the one of the plurality of SR formats comprises at least one of:
   means for receiving the assignment semi-statically via radio resource control (RRC) signaling; or
   means for receiving the assignment dynamically via downlink control information (DCI).

21. The apparatus of claim 19, wherein the BSR is triggered upon arrival of data in a buffer of the apparatus.

22. The apparatus of claim 19, further comprising:
   means for determining whether to drop one or more uplink control information (UCI) bits or multiplex the one or more UCI bits with SR if the one or more UCI bits collide with SR transmission in a subframe based on at least one of the assigned one of the plurality of SR formats or a type of service associated with the UCI.

* * * * *